US008150460B1

(12) United States Patent
Curtis et al.

(10) Patent No.: US 8,150,460 B1
(45) Date of Patent: Apr. 3, 2012

(54) WIRELESS SPEAKERS AND DOCK FOR PORTABLE ELECTRONIC DEVICE

(75) Inventors: Jason Curtis, Antioch, TN (US); Paul Griffin, Nashville, TN (US)

(73) Assignee: Griffin Technology, Inc., Nashville, TN (US)

(*) Notice: Subject to any disclaimer, the term of this patent is extended or adjusted under 35 U.S.C. 154(b) by 1074 days.

(21) Appl. No.: 11/455,029

(22) Filed: Jun. 16, 2006

(51) Int. Cl.
*H04B 1/38* (2006.01)

(52) U.S. Cl. ....... 455/557; 455/74; 455/418; 455/575.1; 455/572.2; 379/174; 379/428.02; 379/430; 381/77; 381/376

(58) Field of Classification Search .................... 455/74, 455/418–420, 575.2, 557, 575.1; 379/174, 379/428.02, 430; 381/376, 77
See application file for complete search history.

(56) References Cited

U.S. PATENT DOCUMENTS

| | | | | |
|---|---|---|---|---|
| 5,666,422 | A | 9/1997 | Harrison et al. | 381/18 |
| 5,673,323 | A | 9/1997 | Schotz et al. | 381/2 |
| 6,212,282 | B1 | 4/2001 | Mershon | 381/77 |
| 6,487,296 | B1 | 11/2002 | Allen et al. | 381/80 |
| 6,590,982 | B1 | 7/2003 | Chen | 381/2 |
| 6,608,907 | B1 | 8/2003 | Lee | 381/311 |
| 6,643,503 | B1 * | 11/2003 | Phillips | 455/340 |
| 6,684,060 | B1 | 1/2004 | Curtin | 455/41 |
| 6,731,761 | B1 | 5/2004 | Zablocki et al. | 381/86 |
| 6,825,810 | B2 | 11/2004 | Ragner et al. | 343/700 |
| 6,926,532 | B1 * | 8/2005 | Brattesani | 434/263 |
| 6,987,992 | B2 | 1/2006 | Hundal et al. | 455/569.1 |
| 7,024,003 | B2 | 4/2006 | Dupeire | 381/79 |
| 7,120,476 | B2 | 10/2006 | Yoo | 455/575.1 |
| 7,657,024 | B2 * | 2/2010 | Huang | 379/428.02 |
| 2002/0072816 | A1 | 6/2002 | Shdema et al. | |
| 2003/0235314 | A1 | 12/2003 | Wang | |
| 2004/0037433 | A1 | 2/2004 | Chen | |
| 2004/0223622 | A1 * | 11/2004 | Lindemann et al. | 381/79 |
| 2008/0212971 | A1 * | 9/2008 | Shaanan et al. | 398/130 |

* cited by examiner

*Primary Examiner* — Dwayne Bost
*Assistant Examiner* — Amancio Gonzalez
(74) *Attorney, Agent, or Firm* — Hornkohl Intellectual Property Law, PLLC; Jason L. Hornkohl

(57) ABSTRACT

An accessory for use with a portable electronic device receives audio signals from the portable electronic device and broadcasts the signals to a set of wireless speakers. The accessory device includes a dock for coupling to the portable electronic device such that audio signals, a power supply signal and digital communication signals can be transferred between the accessory and the device. The accessory receives the audio signals and transmits them to the speakers via a transmitter. The accessory also provides an audio output and video output such that audio and video files can be transferred from the portable electronic device through the accessory to an external device. Preferably, an inductive charging circuit is used to charge a rechargeable power supply in the speakers when the speakers are positioned in a speaker dock on the accessory body.

16 Claims, 3 Drawing Sheets

System Block diagram

WIRELESS SPEAKERS AND DOCK FOR PORTABLE ELECTRONIC DEVICE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

A variety of portable electronic devices such as cellular telephones, digital music players, laptops, personal data assistants, etc. are available that are capable of playing audio files stored in the device. In particular, modern digital music players and cellular telephones are typically capable of storing and playing audio files. Unfortunately, the speakers on these devices are typically small due to the size and power constraints imposed on portable devices. These small speakers are incapable of producing the loud, high quality audio that many consumers demand. However, the power demands of large speakers quickly drain the power supply of a typical portable electronic device and result in the device needing frequent recharging or replacement of batteries.

Some portable electronic devices have output ports that allow them to be physically coupled to external devices such that they can transfer audio to external devices. Unfortunately, physically coupling the devices to external audio systems is often difficult and cumbersome and typically requires an assortment of cables. Thus, a user of a portable electronic device must carry cables with them in order to transfer audio and video from the portable device to an external device. As a result, the cables are seldom available to the user when they are needed most. In addition, the cables limit the placement of any external speakers with respect to the electronic device. FM transmitters have been developed that can be used to transmit audio signals from portable electronic devices to radio receivers. Unfortunately, these devices often have poor transmission quality and it may be difficult to locate a clear transmission frequency for the transmitter.

In light of the above discussed deficiencies in the prior art, what is needed is an apparatus and device for use with a portable electronic device that allows a user to easily listen to high quality audio without draining the power of their portable device or requiring excessive amounts of set up time or equipment.

BRIEF SUMMARY OF THE INVENTION

An embodiment of the present invention is directed toward an accessory for coupling with a portable electronic device, such as a digital music player, that has the capability to play audio files. The accessory includes a docking port adapted to couple to the portable electronic device such that audio signals from the portable electronic device can be transferred to the accessory. At least one speaker assembly is detachably connected to the accessory. The speaker assembly contains a rechargeable battery that is recharged when the speaker is coupled to a speaker port of the accessory. The speaker assembly also includes a wireless receiver. A transmitter in the accessory receives the audio signals from the portable electronic device and transmits the received audio signals to the receivers in the speakers. The transmitter preferably uses a 900 MHz or 2.4 GHz transmission frequency, but can use any acceptable transmission method. A charger, which can be a standard contact pad charger or an inductive charger, provides power to the portable electronic device when the device is coupled to the docking port and charges the rechargeable batteries in the speakers. A wireless remote control is used to control the playback of the audio files stored on the portable electronic device over the accessory's speakers. In a preferred embodiment, the device includes a video output that is coupled to a video output of the portable electronic device such that a video signal can be provided from the portable electronic device to an external device while the portable electronic device is coupled to the docking port of the accessory.

Another embodiment of the present invention is directed toward an apparatus for use with a portable electronic device that has the ability store digital audio files. The apparatus includes a set of detachable speakers. Each of the speakers contains a rechargeable power supply for powering the speaker and a receiver for receiving audio signals. The apparatus also includes a base that has a port adapted to couple to the portable electronic device such that an audio output from the device is received by the base and power can be provided from the base to the portable electronic device. The base also includes a set of speaker ports adapted to be coupled to the set of detachable speakers such that the base can charge the rechargeable battery in each of the detachable speakers when the detachable speakers are coupled to the speaker ports. The speaker ports include an inductive charging circuit for charging the rechargeable batteries in the speakers when they are coupled to the speaker ports. A transmitter in the base transmits the audio signal received from the portable electronic device to the receivers in each of the detachable speakers. The transmitter is preferably adapted to transmit in accordance with a 900 MHz, 2.4 GHz, 5.8 GHz or Bluetooth transmission standard but can use any suitable transmission scheme. Preferably, the transmitter has an effective range of less than 150 feet so that it does not interfere with other devices nearby. A channel switch can be used to alter the broadcast frequency of the transmitter. A video output on the base is coupled to a video output of the portable electronic device such that a video signal can be provided from the portable electronic device to an external device through the apparatus while the portable electronic device is coupled to the docking port.

Yet another embodiment of the present invention is directed toward a device for use with an analog or digital music player. The device includes an input/output port for coupling with an input/output port of the music player such that an audio signal produced by the music player can be received by the device. A transmitter receives the audio signal and broadcasts a signal based thereon. At least one speaker has a receiver for receiving the broadcast signal and producing an audible output based thereon. At least one speaker port couples to the at least one speaker such that an internal power supply of the speaker can be recharged by the device. Preferably, the speaker port includes an inductive charging circuit for charging the internal power supply of the speaker. However, a standard contact pad type charger can be used if desired. The device may produce a logo that is displayed on a screen of the music player. A video output transfers a video signal received from the digital music player to an external device. A wireless remote controls playback of the audio files on the digital music player by communicating with the device which in turn sends control codes to the digital music player which control the playing of the music.

DETAILED DESCRIPTION OF THE INVENTION

Figure 1:
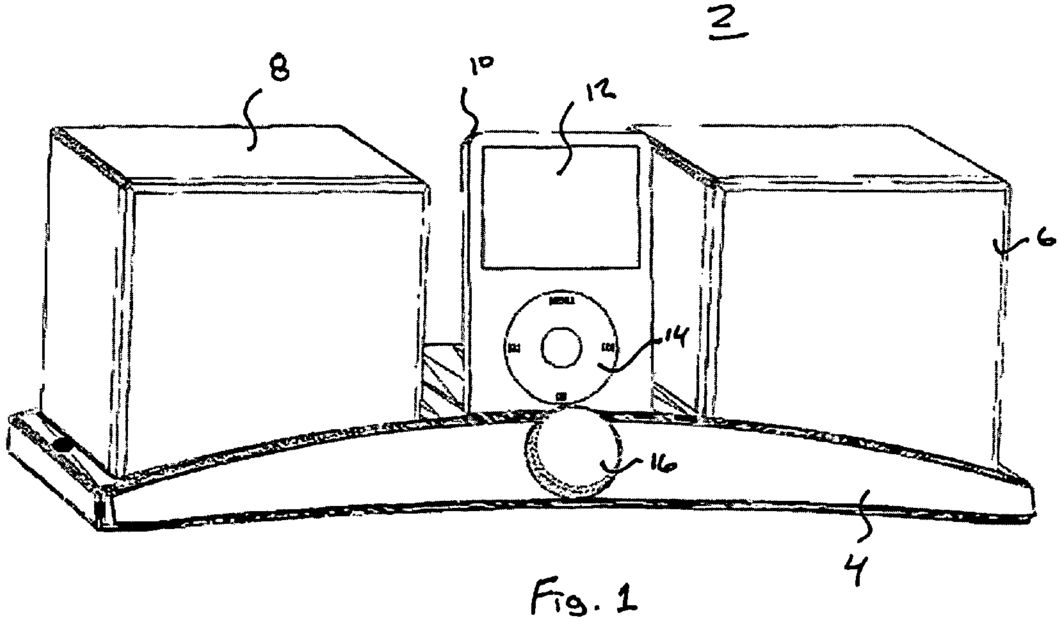
FIG. 1 is a front view of an accessory constructed in accordance with an embodiment of the present invention coupled to a portable electronic device.

Referring now to FIG. 1, a front view of a wireless speaker accessory 2 constructed in accordance with an embodiment of the present invention coupled to a portable electronic device is shown. The wireless speaker accessory 2 shown in FIG. 1 includes a docking base 4 and a pair of detachable wireless speakers 6 and 8. The portable electronic device 10 mounts in an accessory dock on the base 4 such that electronic signals can be transferred between the portable electronic device 10 and the wireless speaker accessory 2. Preferably, the accessory's base 4 supports the portable electronic device 10 in an upright position such that the device's screen 12 can be viewed, and its user inputs 14 manipulated, while the device 10 is mounted on the accessory base 4. The speakers 6 and 8 are also removably mounted in docking stations on the accessory base 4 as discussed in more detail below. In the embodiment shown, a large knob 16 on the base 4 functions as a volume control for the speakers 6 and 8 such that the volume of the audio output of the accessory 2 can be controlled by a user. The knob 16 is preferably a rotary encoder with a momentary press function that enables a standby or low power mode for the accessory 2. The accessory 2 preferably is continuously turned on and enters a low power mode when either the knob 16 is pressed or a predetermined period of inactivity passes. The speakers 6 and 8 also preferably enter into the low power mode when they have not received a signal from the base 4 for a predetermined period of time such as five minutes. In addition, if the receiver in the speakers 6 and 8 loses contact with the transmitter in the base 4, the speakers 6 and 8 preferably immediately enter the low power mode. The speakers 6 and 8 automatically reenter their active mode and return to their last set volume whenever a signal is received from the base 4. The use of a lower power mode allows the speakers 6 and 8 to maximize the life of their rechargeable batteries.

The wireless speaker accessory 2 receives audio signals from the portable electronic device 10 coupled to the docking base 4. The audio signals are then transmitted to the speakers 6 and 8 through a wireless transmission link established between the base 4 and speakers 6 and 8 as discussed in more detail herein. The speakers 6 and 8 produce sounds based upon the received audio signals such that a user can listen to music from the device 10 over the speakers 6 and 8. The wireless transmission link between the speakers 6 and 8 and the accessory base 4 allows the speakers to be positioned anywhere within range of the base's transmitter. The range of the transmitter is preferably limited to reduce the risk of interference with other local transmitters. However, the transmission range of the transmitter can be expanded or reduced for particular applications of the present invention as needed.

Figure 2:
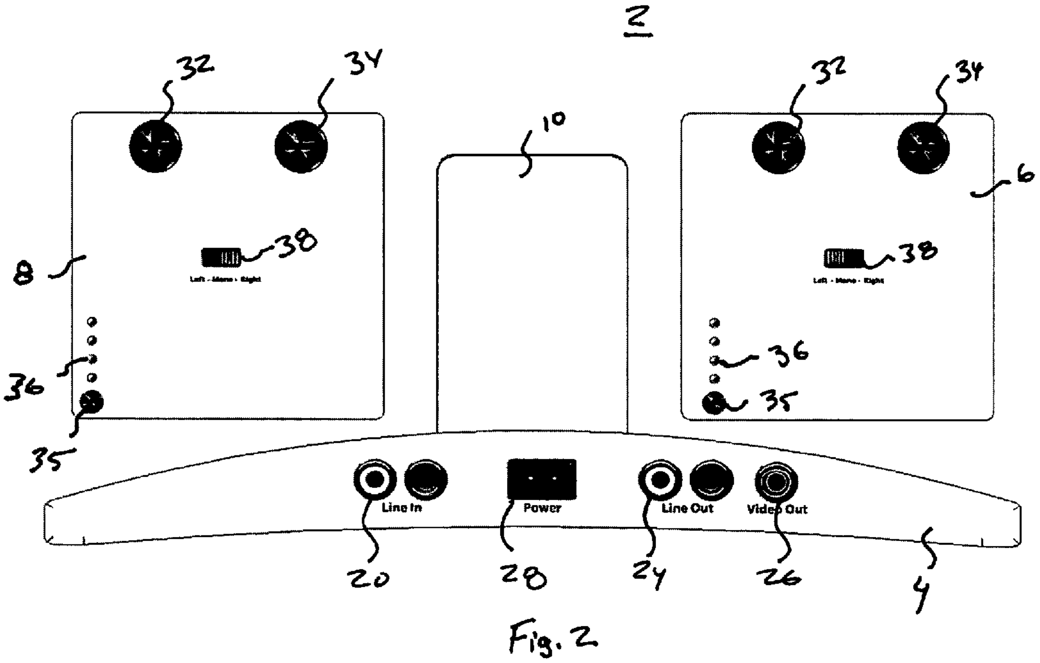
FIG. 2 is a back view of an accessory constructed in accordance with an embodiment of the present invention coupled to a portable electronic device.

Referring now to FIG. 2, a back view of a wireless speaker accessory 2 constructed in accordance with an embodiment of the present invention coupled to a portable electronic device 10 is shown. The base 4 of the accessory 2 has audio line in connectors 20 that allow an audio signal to be brought into the accessory 2 from an external source other than through the accessory's dock. Audio line out connectors 24 provide an audio output such that audio signals coupled from the portable electronic device 10 can be transferred through the accessory base 4 to an external device such as a stereo or television. A video output 26 is also provided such that video signals from a portable electronic device 10 docked in the base 4 can be transferred to an external device such as a VCR, DVD or television. A detachable power connection 28 is preferably used that a variety of power cord lengths can be used to provide power to the wireless speaker accessory 2 from an external power supply such as an AC wall outlet. However, a permanently fixed power cable could obviously be used if desired.

The backs of the speakers 6 and 8 have volume adjustment buttons 32 and 34 that can be used to individually control the volume of the audio produced by each speaker 6 and 8. This allows the speakers 6 and 8 to be independently configured to produce the best possible audio output. The maximum output of the speakers 6 and 8 is preferably determined by a maximum system volume that is set by the transmission from the accessory base 4. The volume controls 32 and 34 on the speakers 6 and 8 allow for the volume to be adjusted between zero and the set maximum. A sliding three position switch 38 is used to configure each speaker 6 and 8 to function as the left hand speaker or right hand speaker in a stereo mode, or both speakers 6 and 8 to function in a mono mode. Alternatively, the speakers 6 and 8 could be permanently configured as a right or left speaker if desired. A set of indicator light emitting diodes (LEDs) 36 are used to visually indicate the power level of the rechargeable batteries in the speakers 6 and 8 when a battery status button 35 is pressed. For example, in a four LED configuration, each LED 36 would represent ¼ of the battery's capacity and, with a full charge, all four LEDs 36 will be lit when the button 35 is pressed. While LEDs are preferred, any type of conventional status indicator could be used.

Figure 3:
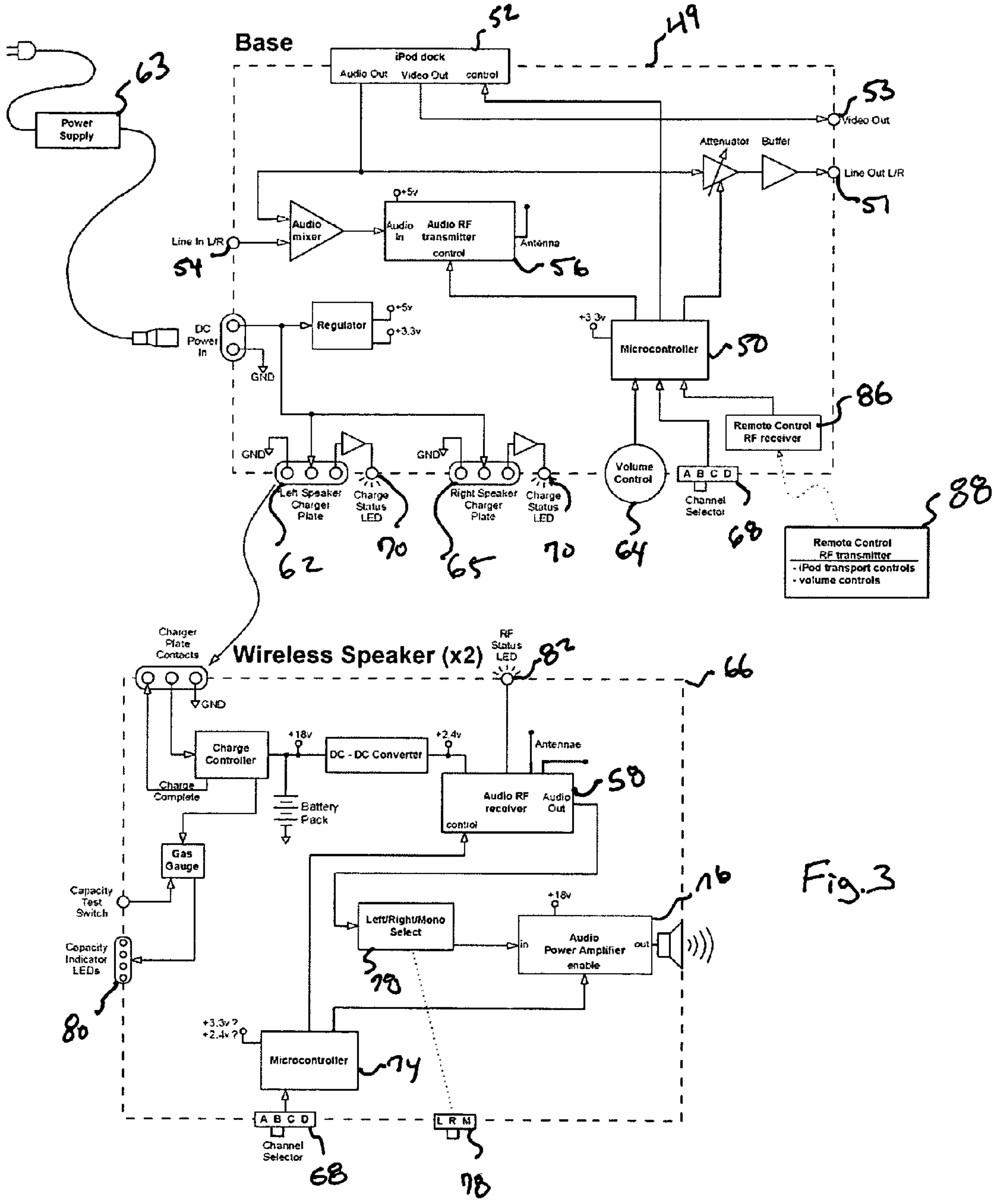
FIG. 3 is a block diagram of the system components of an accessory constructed in accordance with an embodiment of the present invention.

Referring now to FIG. 3, a block diagram of the system components of a wireless speaker accessory constructed in accordance with an embodiment of the present invention is shown. The accessory is primarily controlled by a microcontroller 50 located in the base docking station 49. The microcontroller 50 receives inputs from the portable electronic device dock 52 and the RCA line in connector 54 on the base 49. The received signal is preferably sent to a transmitter 56 that transmits the received signal to a receiver 58 located on each of the detachable speakers 66 for broadcast as described in more detail below. A channel selector 68 on the speakers 66 and base 49 allows a user to select a different transmission channel for the transmitter 56 and receiver 58 such that channels with excessive interference can be avoided. A volume control 64 on the accessory is used to adjust the output level of the signal sent to the speakers 66 by the transmitter 56. The audio signal coupled from the portable electronic device dock 52 may also be output from the accessory to an external device through a RCA line out audio connector 51. If the portable electronic device also has the capability to reproduce video, the video can also be output from an RCA video output 53 on the accessory.

The base portion 49 of the device accessory shown in FIG. 3 includes an RF receiver 86 that receives signals from a remote control 88 having a transmitter. The remote control 88 is used to send commands, such as play, next, previous, pause, up, down, etc., to the portable electronic device through the accessory base 49. The remote control 88 preferably has a rechargeable power supply such as a button cell battery but can use ordinary batteries if desired. The microcontroller 50 runs software that allows the accessory to communicate with the operating system software of a portable electronic device held in the dock 52 of the base 49. This software preferably allows the microcontroller 50 to display images, such as the device maker's logo, on the screen of the portable electronic device. In such an embodiment, the image is serially transmitted to the portable electronic device via the dock connector 52 when the electronic device is connected to the accessory.

The embodiment shown in FIG. 3 incorporates charger plate contacts in the device dock 52 that are used to charge the portable electronic device coupled to the accessory with power received from an external source 63. Additional charging contacts 62 and 65 are provided for charging the rechargeable power supplies in the wireless speakers 66. While a standard physical contact charging system is preferred, those skilled in the art will recognize that an inductive charging system could be used to charge the speakers 66 and the portable electronic device coupled to the dock 52 if desired. A charging status LED 70 is provided on the device to provide a user the ability to determine if the coupled portable electronic device is being charged 70.

Each of the wireless speakers 66, have a microcontroller 74 for managing the various functions of the speakers. In addition, each speaker 66 may include its own volume control and an internal power amp 76 such that the volume of the sound produced by each speaker 66 can be adjusted independently of the volume of the other speaker. A three position switch 78 on each speaker 66 allows a user to configure the speaker as the left or right speaker for stereo audio or place the speaker in a mono mode. A battery status LED 80 indicates the power status of a rechargeable battery in each speaker 66. A signal status LED 82 indicates whether the receivers 58 of the speakers 66 are receiving a signal from the transmitter 56 having a signal strength that is above a predetermined threshold signal level.

The above described wireless speaker device embodiments provide a number of advantages over the prior art. For example, the use of wireless speakers coupled to a portable electronic device through a charging base provides the portable electronic device with improved sound reproduction capabilities while reducing the need to separately charge the portable electronic device. However, although there have been described particular embodiments of the present invention of a new and useful WIRELESS TRANSMITTER FOR PORTABLE ELECTRONIC DEVICE herein, it is not intended that such references be construed as limitations upon the scope of this invention except as set forth in the following claims.

What is claimed is:

1. An accessory for coupling with a portable electronic device having the capability to store audio files, said accessory comprising:

a base having a device dock that is adapted to couple to said portable electronic device such that audio signals from said portable electronic device can be transferred to said accessory and a speaker dock;

at least one rechargeable, battery-powered speaker assembly in a speaker housing that can be detachably connected to and mounted on said speaker dock of said base wherein said rechargeable, battery-powered speaker assembly includes a wireless receiver;

a device charger for providing power to said portable electronic device when said device is coupled to said device dock;

a speaker charger in said base that charges said rechargeable, battery-powered speaker assembly when said rechargeable, battery-powered speaker assembly is connected to said speaker dock through a charging plate positioned in said speaker dock; and a transmitter adapted to receive said audio signals and transmit said received audio signals to said receiver in said rechargeable, battery-powered speaker.

2. The accessory of claim 1 wherein said portable electronic device is a digital music player.

3. The accessory of claim 1 further comprising a wireless remote control that controls a playback of an audio file stored on said portable electronic device.

4. The accessory of claim 1 further comprising a video output that is coupled to a video output of said portable electronic device such that a video signal can be provided from said portable electronic device to an external device while said portable electronic device is coupled to said docking port.

5. An apparatus for use with a portable electronic device wherein said portable electronic device has an ability to store digital audio files, said apparatus comprising:

a set of detachable speakers wherein each of said speakers contains a rechargeable power supply for powering said speaker and a receiver for receiving an audio signal; and a base comprising:

a device port adapted to couple said portable electronic device such that an audio output from said device is received by said base and such that power can be provided from said base to said portable electronic device via an inductive charging system;

a set of speaker ports adapted to hold and couple to said set of detachable speakers through a charging plate contact positioned in each of said speaker port such that said base can charge said rechargeable battery in each of said detachable speakers are coupled to said speaker ports; and a transmitter for transmitting said audio signal received from said portable electronic device to said receivers in each of said detachable speakers.

6. The apparatus of claim 5 wherein said transmitter is adapted to transmit in accordance with either a 900 MHz or 2.4 GHz standard.

7. The apparatus of claim 5 further comprising a video output that is coupled to a video output of said portable electronic device such that a video signal can be provided from said portable electronic device to an external device through said apparatus while said portable electronic device is coupled to said docking port.

8. The apparatus of claim 5 wherein said transmitter has an effective range of less than 150 feet.

9. The apparatus of claim 5 wherein said portable electronic device is a digital music player.

10. A device for use with a digital music player, said device comprising:

an input/output port for coupling with an input/output port of said digital music player such that an audio signal produced by said digital music player can be received by said device;

a music player charger for charging a rechargeable power supply of said digital music player when said digital music player is coupled to said input/output port;

a transmitter for receiving said audio signal and broadcasting a signal based thereon; and at least one rechargeable, battery-powered speaker having a receiver for receiving said broadcast signal and producing an audible output based thereon; and at least one speaker port adapted to hold said at least one rechargeable, battery-powered speaker and couple to said at least one rechargeable, battery-powered speaker through a charging plate contact positioned in said speaker port such that said at least one rechargeable, battery-powered speaker can be recharged by said device.

11. The device of claim 10 wherein said device produces a logo that is displayed on a screen of said digital music player.

12. The device of claim 10 further comprising a video output for transferring a video signal received from said digital music player to an external device.

13. The device of claim 10 wherein said transmitter is adapted to transmit in accordance with either a 900 MHz of 2.4 GHz standard.

14. The device of claim 10 wherein said device is adapted to be physically and electrically coupled to said digital music player.

15. The accessory of claim 1 wherein said at least one rechargeable, battery-powered speaker assembly further comprises a volume control that controls an audio output level of said speaker assembly.

16. The accessory of claim 1 wherein said at least one rechargeable, battery-powered speaker assembly further comprises a left and right audio control that allows a user to configure said speaker assembly to receive either a left or right audio signal from said accessory.

* * * * *